R. O. HENDRICKSON.
GEARING.
APPLICATION FILED AUG. 11, 1911.
1,192,195.
Patented July 25, 1916.
2 SHEETS—SHEET 1.
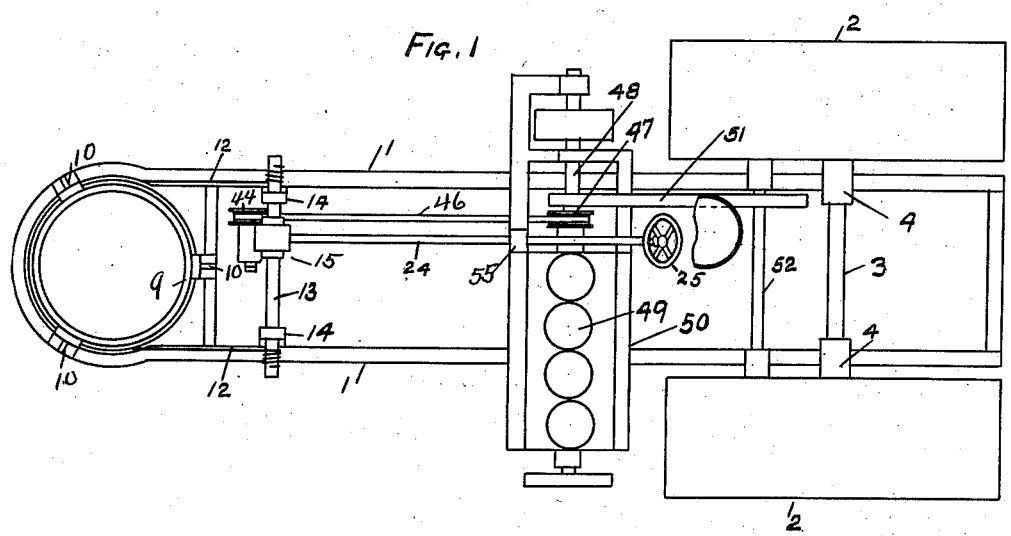
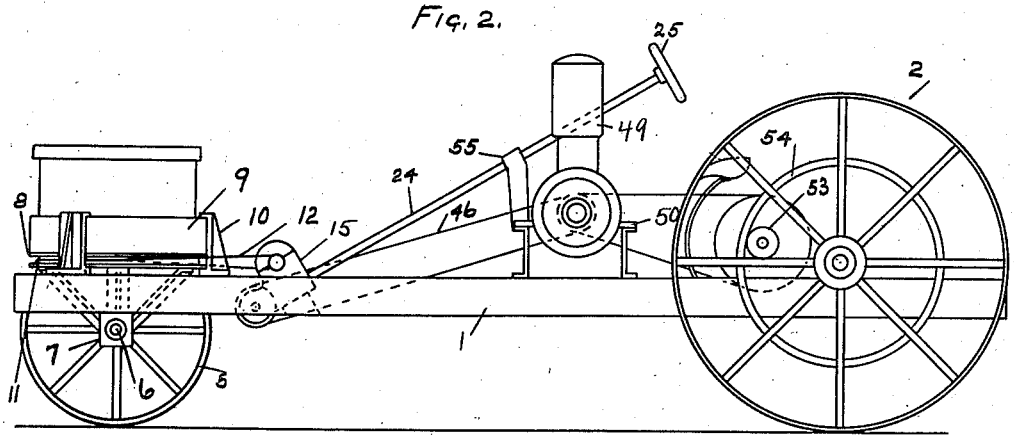
Witnesses
B. M. Hartman
Vinner C. Hess
Inventor
Robert O. Hendrickson
Attorney

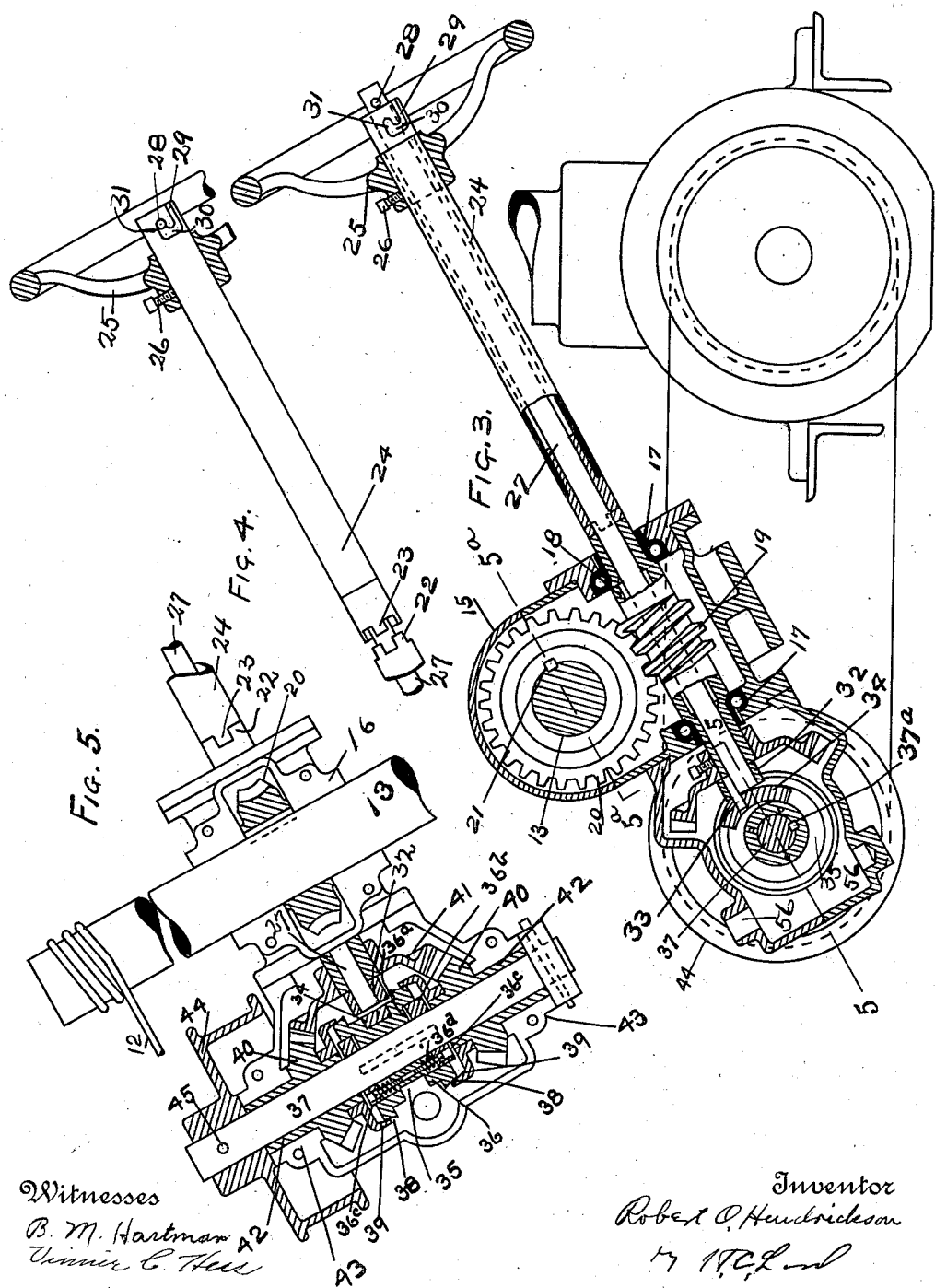

UNITED STATES PATENT OFFICE.

ROBERT O. HENDRICKSON, OF PORTLAND, OREGON, ASSIGNOR, BY MESNE ASSIGNMENTS, TO WALLIS TRACTOR COMPANY, OF RACINE, WISCONSIN, A CORPORATION OF WISCONSIN.

GEARING.

1,192,195.  Specification of Letters Patent.  Patented July 25, 1916.

Application filed August 11, 1911. Serial No. 643,620.

*To all whom it may concern:*

Be it known that I, ROBERT O. HENDRICKSON, a citizen of the United States, residing at Portland, in the county of Multnomah and State of Oregon, have invented new and useful Improvements in Gearing, of which the following is a specification.

This invention relates to gearing and consists in certain improvements in the construction thereof as will be hereinafter fully described and pointed out in the claims.

The object of the invention is to provide a simple and efficient gearing capable of use as a steering gear for traction engines and in the illustration of the invention the gearing is so applied. In engines of this class, especially the higher power engines, the power necessary to handle the steering apparatus is such as to be inconvenient for hand operation.

In the present invention, means are provided for utilizing the power of the engine for operating the steering member. Preferably, the mechanism is so arranged that this may be thrown into and out of action by the steering wheel. The construction is also arranged so that the steering wheel may be utilized for hand steering if desired.

The invention is illustrated in the accompanying drawings as follows:

Figure 1 shows a plan view of a traction engine. Fig. 2 a side elevation of a traction engine. Fig. 3 a central section showing the steering wheel, post and steering mechanism immediately attached thereto and a fragment of the driving wheel in elevation. Fig. 4 a similar section of the steering post, and steering wheel, with the steering wheel in position for throwing in the power steering mechanism. Fig. 5 sections on the lines 5—5 and 5ª—5ª in Fig. 3.

1 marks the frame of the traction engine, 2 the drive wheels, 3 the drive wheel axles, 4 the hangers for securing the drive wheel axles to the frame.

5 marks the steering wheel, 6 the steering wheel axle, 7 a bracket for sustaining the steering wheel, 8 a head on which the bracket 7 is attached, 9 the circular bottom for the radiator forming a bearing for the head 8, and 10 brackets securing the circular bottom or bearing 9 on the frame. The head 8 has the annular groove 11 in which is arranged a flexible connection such as a cable or chain 12. The ends of this cable 12 are wound on the shaft 13 extending across the frame and carried by the bearings 14. The cable 12 is wound on the shaft 13 in opposite directions so that as the shaft is turned in either direction, the cable is paid out at one end and wound up at the opposite end, thus actuating the steering member through the action of the cable on the head 8.

A gear case 15 is carried by the bearing 16 on the shaft 13. This gear case is also provided with the bearings 17 in which the worm sleeve 18 is journaled, preferably by means of a ball bearing as shown. The worm sleeve carries the steering worm 19 and the steering worm 19 meshes the worm gear 20. The worm gear 20 is mounted on the shaft 13 and fixed thereon by a key 21. The worm sleeve 18 is provided with the detents 22 at its upper end which are adapted to be engaged by the detents 23 on the steering post 24. The steering wheel 25 is fixed on the steering post by means of the screw 26. A shaft 27 extends through the steering post, the steering post being in the form of a sleeve for this purpose, and also through the worm sleeve 18. The shaft 27 therefore forms a bearing for the post so that the detents 23 on the post 24 may be withdrawn from the detents 22 on the worm sleeve by sliding the post on the shaft 27.

The shaft 27 is provided with a pin 28 at its upper end and this is adapted to enter the bayonet slot at the end of the steering post; this slot having the inwardly extending portion 29, lateral portion 30 and the outwardly extending portion 31. It will be readily observed that by bringing the portion of the slots 29 into register with the pin 28, the steering post may be lifted on the shaft 27, bringing the pin 28 into the lateral portion 30. By turning the post, the pin can be brought into the portion 31 and then dropped into the socket formed by the portion 31. The portion 31 is of such depth that when the pin 28 is seated in the portion 31, the detents 23 and 22 are maintained out of engagement and at the same time, the steering post is locked against turning on the shaft 27. By using this mechanism, the steering post may be thrown into engagement with the worm sleeve 18 by simply lifting the steering post so as to throw it out of the portion 31 of the bayonet slot, turning the wheel so as to drop it into engagement as shown in Fig. 3. With the parts in this position, the engine may be controlled directly from the steering wheel, the steering post acting directly on the worm and the worm on the gear 20 so as to turn the shaft 13 and actuate the steering member. When it is desired to throw in the power, the steering wheel is thrown into the position shown in Fig. 4. This disengages it from the direct connection through the members 22 and 23 and the power mechanism is controlled from the steering wheel acting on the shaft 27.

The shaft 27 terminates in a crank 32 having a crank pin 33 which is rocked by the shaft 27. The crank pin extends into a block 34 and the block 34 is arranged in a groove 35 in the sliding clutch member 36. The sliding clutch member is locked against turning on the shaft 37 by a spline and groove 37a and is free to move axially on the shaft. The sliding clutch member has the cone surfaces 38 at its ends which are adapted to be thrown into engagement with the cone surfaces 39 on the opposing clutch members and the members having the cone surfaces 39 are fixed on the gears 40. The gears 40 are journaled on the shaft 37 and engage a gear 41 fixed on the end of the worm sleeve 18.

The shaft 37 is continuously rotated in one direction. It will be readily observed that by throwing the clutch member 36 into engagement with the gear 40 at one side, a reverse movement is given to the worm sleeve from what is given to the worm sleeve when the clutch member is thrown into engagement with the opposite gear 40. By turning the shaft 27, the crank 32 is oscillated and this operating through the block 34 throws the sliding clutch member 36 into engagement in either direction so as to give the direction to the worm sleeve desired. The sliding clutch member 36 has the sockets 36a at each end in which is arranged a collar or pressure block 36b. Screws 36c are screwed through the pressure blocks 36b and into the clutch member 36. Coil springs 36d are arranged around the screws and between the bottoms of the sockets 36a and the pressure blocks 36b. The screws are turned in so as to adjust the blocks 36b to fill the space between the gears 40. Sockets are arranged in the blocks 36b for the heads of the screws 36c, and are of sufficient depth to permit the movement of the block 36 with the screw a sufficient distance to throw the cone surfaces 38 into engagement with the cone surfaces 39, but as soon as the shaft 27 is released, the spring 36c which is compressed, will throw the clutch out of engagement, and the springs operating on each of the blocks 36b will hold the sliding clutch member in a neutral position.

The gears 40 have the extended hubs 42 which operate in bearings 43 in the gear casing 15. The shaft 37 is journaled in these hubs. A pulley 44 is fixed on the end of the shaft 37 by means of a pin 45 and a belt 46 drives the pulley 44 from a pulley 47 on the engine shaft 48. In this way, it will be seen that the shaft 37 will be rotated at all times while the engine is in motion.

The position of the engine is indicated by the cylinders 49 in outline which are mounted on the engine frame 50 and the power is communicated by means of a chain drive 51 from the engine shaft to the drive shaft 52. This is provided with the gears 53 which mesh gears 54 on the drive wheels 2 and thus drive the traction engine.

I prefer to provide a bearing 55 for the steering post 24. In this way the gear case may be mounted on the shaft 13, the bearing 55 operating on the steering post holding it against rotation on the shaft.

While I have shown the sliding clutch member 36 as being operated from the steering wheel, it will be understood that in the broader phases of my invention, the sliding clutch member may be operated by other agencies, especially, a furrow follower. In the drawings a socket 56 is shown for the insertion of a crank shaft for operating the sliding clutch member in this manner. Where this is utilized, the steering wheel is simply placed on the pin 28 and thus drawn out of action except for the slight movement that the sliding clutch member gives it.

What I claim as new is:

1. In a device of the class described, a power shaft, means for driving the same, gears loose on said power shaft, a clutch for engaging said gears alternatively with the power shaft, a second shaft having a pinion thereon engaged by the gears on the power shaft, a driven shaft, gearing between said second shaft and driven shaft, a rotary shaft for shifting said clutch, a hand wheel and means for connecting said hand wheel at will with either said second shaft or the clutch shifting shaft.

2. In a device of the class described, a power shaft, means for driving the same, a pair of gears loosely mounted on the power shaft, a clutch for alternatively engaging said gears with the power shaft, a rotary shaft having means thereon for shifting the said clutch, a hollow shaft surrounding said rotary shaft and having a pinion engaged by the gears on the power shaft, a driven shaft, gearing between the hollow shaft and the driven shaft for transmitting motion to the latter, a hand wheel and means for connecting a hand wheel at will with either the clutch shifting shaft or the concentric shaft.

3. In a gearing, a driven shaft, a power shaft parallel thereto, pinions loose on said power shaft, a clutch for connecting either pinion at will to said power shaft, an intermediate gear meshing with said pinions, a hollow rotary shaft connected to said gear, a rotary shaft extending through said hollow shaft, means on the last mentioned shaft for shifting the clutch, means on said hollow shaft for driving the driven shaft, a hand wheel, and means for connecting the same at will to either the hollow shaft or the shaft extending therethrough.

4. In a device of the class described, a driven shaft, a power shaft substantially parallel thereto, gears loosely mounted on the power shaft, a clutch on the power shaft for alternatively locking either of said gears therewith, concentric shafts arranged transversely of the power shaft, a gear on one of said concentric shafts engaged by the gears upon the power shaft, and driving connections from the last said concentric shaft to said driven shaft, means on the other of said concentric shafts for shifting the clutch, a hand wheel concentric with said concentric shafts and longitudinally shiftable means for connecting the hand wheel to said concentric shafts alternatively.

5. In a gearing, a driven shaft, a gearing element mounted thereon, a sleeve shaft having a gear element thereon intermeshing with the element on the driven shaft, a power shaft, intermeshing gears on the power shaft and sleeve shaft respectively, a clutch for locking the gear on the power shaft thereto, a rod for operating the clutch extending through the sleeve shaft, a hand wheel and means for connecting the hand wheel at will to the sleeve shaft and to the rod.

6. In a gearing, a driven shaft having a gear thereon, a sleeve shaft having means thereon for driving said gear, a power shaft, gears on the power shaft and sleeve shaft intermeshing with each other, a clutch upon the power shaft, a rod extending through the sleeve shaft, means on said rod for shifting the clutch, a hollow wheel post mounted upon the rod and longitudinally movable with reference thereto, said post and sleeve shaft having engaging means formed thereon, a hand wheel mounted on the wheel post and means on the wheel post for engaging the rod extending therethrough to turn the same.

7. In a gearing, the combination of a shaft to be operated; an actuating gear on said shaft; an actuating sleeve shaft having means for rotating said gear; a controlling shaft extending through said sleeve; an operating wheel post on said controlling shaft; a detachable connection between said post and said sleeve shaft; a bayonet connection between the post and controlling shaft adapted to hold the post out of engagement with the sleeve shaft; a power actuating mechanism for actuating said sleeve shaft; and a reversing mechanism actuated by said controlling shaft for controlling said power mechanism.

8. In a gearing, the combination of a shaft to be operated; an actuating gear on said shaft; an actuating sleeve having means for rotating said gear; a controlling shaft extending through said sleeve shaft; an operating wheel post on said controlling shaft; a detachable connection between said post and said sleeve shaft; a bayonet connection between the post and controlling shaft adapted to hold the post out of engagement with the actuating shaft; a power actuating mechanism for actuating said sleeve shaft; a reversing mechanism actuated by said controlling shaft for controlling said power mechanism; and means for normally holding the power mechanism out of engagement.

9. In a gearing, the combination of a shaft to be operated; a worm gear on said shaft; a worm sleeve operating said worm gear; a controlling shaft extending from the worm gear; a controlling post on the controlling shaft and having a detachable connection with the worm sleeve; a bayonet connection between the post and controlling shaft; a power mechanism connected with the worm sleeve; and reversing devices controlled by the controlling shaft for said power mechanism.

10. In a gearing, the combination of a shaft to be operated; a worm gear on said shaft; a worm sleeve operating said worm gear; a controlling shaft extending from the worm gear; a controlling post on the controlling shaft and having a detachable connection with the worm sleeve; a bayonet connection between the post and controlling shaft; a power mechanism connected with the worm sleeve; reversing devices controlled by the controlling shaft for said power mechanism; and spring actuated devices for holding the reversing devices in a neutral position.

11. In a gearing, the combination of a shaft to be operated; a power mechanism for actuating said shaft comprising a common gear; a power shaft; reversing gears on said power shaft operating on the opposite sides of the common gear; a clutch between the reversing gears comprising a sliding clutch member on the power shaft, said sliding clutch member having sockets in its ends; blocks in the sockets; screws connecting said blocks with the sliding clutch member; springs around the screws and between the blocks and the clutch member, said screws being adapted to position the blocks to hold the clutch member in a neutral position; and means for controlling the sliding clutch member.

12. In a gearing, the combination of a shaft to be operated; a power mechanism controlling the shaft; a controlling shaft controlling the power mechanism; an operating wheel; a direct connection between the operating wheel and the shaft to be operated; and a bayonet connection between the operating wheel and the controlling shaft arranged to maintain the operating wheel and the shaft to be operated out of connection.

In testimony whereof I have hereunto set my hand in the presence of two subscribing witnesses.

ROBERT O. HENDRICKSON.

Witnesses:
O. P. CONGER,
F. G. STREET.